United States Patent
Grauerholz et al.

(12)

(10) Patent No.: US 12,369,028 B2
(45) Date of Patent: Jul. 22, 2025

(54) PERSONAL IDENTIFICATION NUMBER (PIN) UNLOCK IN AUTOMATED WIRELESS COMMUNICATION DEVICE TESTING

(71) Applicant: T-Mobile Innovations LLC, Overland Park, KS (US)

(72) Inventors: Zachary Marc Sinclair Grauerholz, Olathe, KS (US); James Luther Henry Thomas, Coppell, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 448 days.

(21) Appl. No.: 17/987,669

(22) Filed: Nov. 15, 2022

(65) Prior Publication Data

US 2024/0163669 A1    May 16, 2024

(51) Int. Cl.
| | |
|---|---|
| *H04W 12/06* | (2021.01) |
| *H04W 4/80* | (2018.01) |
| *H04W 12/50* | (2021.01) |
| *H04W 76/11* | (2018.01) |
| *H04W 76/14* | (2018.01) |

(52) U.S. Cl.
CPC .......... *H04W 12/068* (2021.01); *H04W 4/80* (2018.02); *H04W 12/50* (2021.01); *H04W 76/11* (2018.02); *H04W 76/14* (2018.02)

(58) Field of Classification Search
None
See application file for complete search history.

(56) References Cited

U.S. PATENT DOCUMENTS

| | | | |
|---|---|---|---|
| 2019/0182667 A1* | 6/2019 | Fujii | H04L 63/08 |
| 2022/0095097 A1* | 3/2022 | Singh | H04L 67/10 |

\* cited by examiner

*Primary Examiner* — Frantz Bataille (57) ABSTRACT

A method for personal identification number (PIN) unlock in automated wireless communication device testing is disclosed. The method comprises initially pairing a wireless communication device undergoing automated testing with a Bluetooth-enabled microprocessor using a media access control (MAC) address and loading, by a host computer, an image file into the Bluetooth-enabled microprocessor. The method also comprises pairing the wireless communication device with the Bluetooth-enabled microprocessor based on the MAC address in response to the wireless communication device requiring the PIN and broadcasting, by the Bluetooth-enabled microprocessor, the PIN until the PIN is received by the wireless communication device. The wireless communication device is unlocked using the PIN and undergoes at least some of the automated testing after being unlocked. The method further comprises stopping broadcasting of the PIN by the Bluetooth-enabled microprocessor in response to the wireless communication device receiving the PIN from the Bluetooth-enabled microprocessor.

21 Claims, 5 Drawing Sheets

PERSONAL IDENTIFICATION NUMBER (PIN) UNLOCK IN AUTOMATED WIRELESS COMMUNICATION DEVICE TESTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may undergo testing. Such testing may include device component testing, application testing, and/or other type of testing. This wireless communication device testing may be performed through automation and/or remote control.

SUMMARY

In an embodiment, a method for personal identification number (PIN) unlock in automated wireless communication device testing is disclosed. The method comprises initially pairing a first wireless communication device undergoing automated testing with a Bluetooth-enabled microprocessor using a first media access control (MAC) address, restarting the first wireless communication device, and loading, by a host computer, a first image file into the Bluetooth-enabled microprocessor. The first image file comprises the first MAC address and a first wireless communication device PIN. The method also comprises pairing the first wireless communication device with the Bluetooth-enabled microprocessor based on the first MAC address after the first wireless communication device restarts and broadcasting, by the Bluetooth-enabled microprocessor, the first wireless communication device PIN until the first wireless communication device PIN is received by the first wireless communication device. The first wireless communication device is unlocked using the first wireless communication device PIN and undergoes at least some of the automated testing after being unlocked. The method additionally comprises stopping broadcasting of the first wireless communication device PIN by the Bluetooth-enabled microprocessor in response to the first wireless communication device receiving the first wireless communication device PIN from the Bluetooth-enabled microprocessor and initially pairing a second wireless communication device undergoing automated testing with the Bluetooth-enabled microprocessor using a second MAC address. The first and second MAC addresses are different. The method further comprises restarting the second wireless communication device and loading, by the host computer, a second image file into the Bluetooth-enabled microprocessor. The second image file comprises the second MAC address and a second wireless communication device PIN for the second wireless communication device. The method also comprises pairing the second wireless communication device with the Bluetooth-enabled microprocessor based on the second MAC address after the second wireless communication device restarts and broadcasting, by the Bluetooth-enabled microprocessor, the second wireless communication device PIN until the second wireless communication device PIN is received by the second wireless communication device. The second wireless communication device is unlocked using the second wireless communication device PIN and undergoes at least some of the automated testing after being unlocked. The method further comprises in response to the second wireless communication device receiving the second wireless communication device PIN from the Bluetooth-enabled microprocessor, stopping broadcasting of the second wireless communication device PIN by the Bluetooth-enabled microprocessor.

In another embodiment, a system for personal identification number (PIN) unlock in automated wireless communication device testing is disclosed. The system comprises a wireless communication device undergoing automated testing. The wireless communication device is initially paired with a Bluetooth-enabled microprocessor using a media access control (MAC) address. The system also comprises a database comprising the MAC address and a PIN associated with the wireless communication device. There is a one-to-one relationship between the MAC address and the wireless communication device to prevent other wireless communication devices from being able to receive the PIN. The system additionally comprises a host computer configured to load an image file into the Bluetooth-enabled microprocessor in response to the wireless communication device restarting. The image file comprises the MAC address and the PIN for the wireless communication device from the database. The system further comprises the Bluetooth-enabled microprocessor configured to broadcast the PIN after the wireless communication device restarts and pairs with the Bluetooth-enabled microprocessor based on the MAC address until the PIN is received by the wireless communication device and stop broadcasting the PIN in response to the wireless communication device receiving the PIN. The wireless communication device is unlocked using the PIN and undergoes at least some of the automated testing after being unlocked.

In yet another embodiment, a method for personal identification number (PIN) unlock in automated wireless communication device testing is disclosed comprising initially pairing a wireless communication device undergoing automated testing with a Bluetooth-enabled microprocessor using a media access control (MAC) address and loading, by a host computer, an image file into the Bluetooth-enabled microprocessor. The image file comprises the MAC address and a PIN for the wireless communication device. There is a one-to-one relationship between the MAC address and the wireless communication device to prevent other wireless communication devices from being able to receive the PIN. The method also comprises pairing the wireless communication device with the Bluetooth-enabled microprocessor based on the MAC address in response to the wireless communication device requiring the PIN and broadcasting, by the Bluetooth-enabled microprocessor, the PIN until the PIN is received by the wireless communication device. The wireless communication device is unlocked using the PIN and undergoes at least some of the automated testing after being unlocked. The method further comprises stopping broadcasting of the PIN by the Bluetooth-enabled microprocessor in response to the wireless communication device receiving the PIN from the Bluetooth-enabled microprocessor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication providers test wireless communication devices. Such testing may be remote controlled and/or automated. Wireless communication devices may require a personal identification number (PIN) when restarted. For example, with certain types of wireless communication devices including wireless communication devices with an iOS operating system, when the wireless communication device is restarted, a PIN must be entered into the screen of the wireless communication device and this cannot be done via conventional automation. The pending application addresses this technical challenge by providing a Bluetooth-enabled microprocessor that is custom programmed via a host computer with an image file that comprises a particular media access control (MAC) address and PIN to pair with the specific wireless communication device. The wireless communication device pairs with the Bluetooth-enabled microprocessor based on the particular MAC address, and the Bluetooth-enabled microprocessor broadcasts the PIN to the wireless communication device via a Bluetooth connection. The Bluetooth-enabled microprocessor with the image file loaded thereon may be used as a virtual keyboard for the wireless communication device to enable the inputting of the required PIN to the wireless communication device during testing of the wireless communication device to overcome the technical problem of not being able to input the PIN during testing via conventional automation.

After a brief interchange with the wireless communication device long enough for the wireless communication device to receive the PIN, the Bluetooth-enabled microprocessor stops broadcasting the PIN and communicating with the wireless communication device. This helps maintain security by preventing other wireless communication devices from being able to receive the PIN. Further, there is a one-to-one relationship between the MAC address and the wireless communication device, which also helps to maintain security and prevents other wireless communication devices from being able to receive the PIN. Stated differently, only one wireless communication device can establish a session with the Bluetooth-enabled microprocessor at a time.

After the PIN is received by the wireless communication device from the Bluetooth-enabled microprocessor, the wireless communication device is unlocked using the received PIN and undergoes automated testing after being unlocked. A tester may use a local tester computer to issue commands associated with automated tests on the wireless communication device. In particular, the local tester computer may communicate with the host computer, which may be linked via Universal Serial Bus (USB) connections to the wireless communication device and the Bluetooth-enabled microprocessor, to conduct automated tests. The local tester computer may also remotely command execution of testing scripts on the wireless communication device from remote locations (e.g., from a remote server) via secure network connections.

The MAC addresses and PINs associated to different wireless communication devices undergoing testing are stored in a database and accessed dynamically during the restart. For example, when the Bluetooth-enabled microprocessor is needed to restart a different wireless communication device undergoing testing, the Bluetooth-enabled microprocessor may be reprogrammed with a different image file via the host computer that comprises a different MAC address and different PIN from the database to pair with the different wireless communication device. In an embodiment, the image file loaded to the Bluetooth-enabled device is compiled on-the-fly by the host computer during the restart using the information from the database (i.e., the corresponding MAC address and PIN).

During testing, there may be other times a PIN is required besides a restart. For example, a PIN may be required for a wireless communication device when an automatic lock occurs. In another example, some wireless communication devices require a PIN to enable automation. The Bluetooth-enabled microprocessor and the process discussed herein can be used to provide a PIN to a wireless communication device undergoing testing whenever a PIN is needed during testing.

Figure 1:
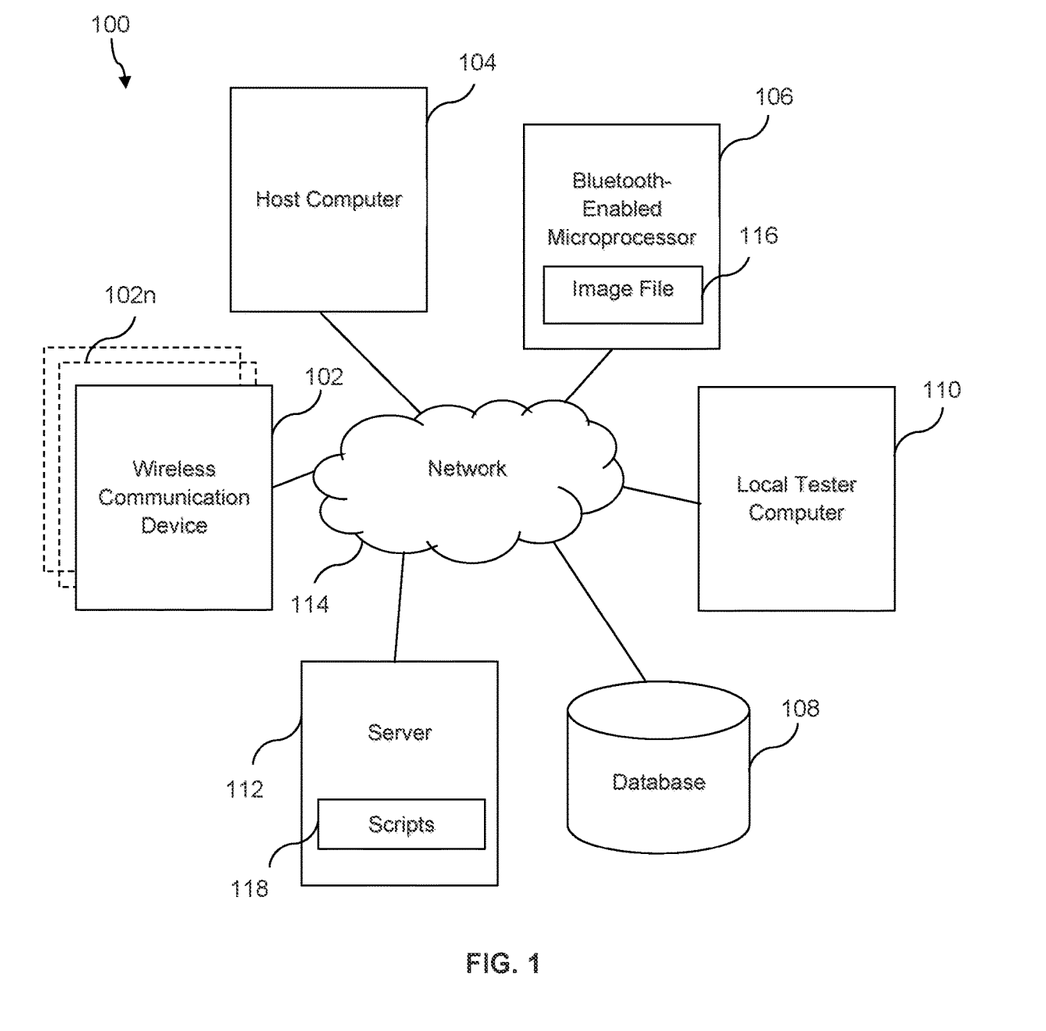
FIG. 1 is a block diagram of a testing system according to an embodiment of the disclosure.

Turning now to FIG. 1, a testing system 100 is described. In an embodiment, the testing system 100 comprises a wireless communication device 102, a host computer system 104, a Bluetooth-enabled microprocessor 106, a database 108, a local tester computer 110, a server 112, and a network 114. The wireless communication device 102 may be a mobile phone, a smart phone, a personal digital assistant (PDA), a wearable computer, a headset computer, a laptop computer, a notebook computer, a tablet computer, or another type of wireless communication device. The wireless communication device 102 may be undergoing automated testing. Such testing may comprise testing applications, device component testing (e.g. does the keyboard work correctly, can I originate a phone call, etc.), and/or other types of wireless communication device testing. In some embodiments, there may be a plurality of wireless communication devices undergoing automated testing including wireless communication device 102 and a different wireless communication device 102*n*.

There may be points during the automated testing process that a PIN is required for the wireless communication device 102 such as at restart, after an automatic lock, or to enable automation. Additionally, some wireless communication devices 102, 102*n* such as wireless communication devices with an iOS operating system may not be able to accept a PIN during testing via conventional automation. The components of the testing system 100 help to overcome these technical challenges as discussed in more detail below.

The wireless communication device 102 may be initially paired with the Bluetooth-enabled microprocessor 106 using a corresponding MAC address prior to testing beginning. The initial pairing of the wireless communication device 102 with the Bluetooth-enabled microprocessor 106 may be performed manually. Once the wireless communication device 102 is initially paired with the Bluetooth-enabled microprocessor 106, each time the wireless communication device 102 sees the corresponding MAC address of the Bluetooth-enabled microprocessor 106, the wireless communication device 102 can automatically connect to the Bluetooth-enabled microprocessor 106. In an embodiment, the Bluetooth-enabled microprocessor 106 comprises a Bluetooth board sold under the name Adafruit Feather nRF52 Bluefruit. In other embodiments, other Bluetooth boards are used for the Bluetooth-enabled microprocessor 106.

When a PIN is required for the wireless communication device 102 during automated testing of the wireless communication device 102, the Bluetooth-enabled microprocessor 106 may be custom programmed via the host computer 104 with an image file 116 that comprises the corresponding MAC address and a corresponding PIN to pair with the wireless communication device 102. The image file 116 may comprise a BIN file or a binary file. A binary file is a computer file whose content is in a binary format. A binary file is more efficient in terms of using less memory than a text file. Additionally, since a binary file is usually much smaller than a text file, it can be transmitted and processed faster, which is advantageous.

The host computer 104 may obtain the corresponding MAC address and the corresponding PIN associated with the wireless communication device 102 from the database 108. In an embodiment, the database stores a plurality of MAC addresses and PINs for a plurality of wireless communication devices undergoing testing. Each MAC address and corresponding PIN may be associated with one wireless communication device in the database 108 via a wireless communication device identity. There may be a one-to-one relationship between a MAC address and the wireless communication device 102, which helps to maintain security and prevent other wireless communication devices from being able to receive the corresponding PIN.

The host computer 104 may compile the image file 116 based on the corresponding MAC address and the corresponding PIN received from the database 108 and load the image file 116, which includes the corresponding MAC address and the corresponding PIN, into the Bluetooth-enabled microprocessor 106. The image file 116 may be compiled and loaded into the Bluetooth-enabled microprocessor 106 in response to a restart of the wireless communication device 102, in response to an automatic lock occurring on the wireless communication device 102, after a predefined period of time of a lack of response from the wireless communication device 102, or in response to some other event that signifies that a PIN is needed by the wireless communication device 102 under test. The Bluetooth-enabled microprocessor 106 with the image file 116 loaded thereon may be used as a virtual keyboard for the wireless communication device 102. The host computer 104 may be a general purpose computer described in more detail in regard to FIG. 4.

After the image file 116 is loaded into the Bluetooth-enabled processor 106, the Bluetooth-enabled processor 106 may broadcast the corresponding PIN wirelessly. For example, the Bluetooth-enabled processor 106 may broadcast the corresponding PIN via Bluetooth wireless communication until the corresponding PIN is received by the wireless communication device 102. In order for the wireless communication device 102 to receive the corresponding PIN, the wireless communication device 102 will have had to pair with the Bluetooth-enabled microprocessor 106 based on the corresponding MAC address used in the initial pairing. In an embodiment, the broadcasting of the corresponding PIN is delayed until the wireless communication device 102 is paired with the Bluetooth-enabled microprocessor 106.

In an embodiment, the Bluetooth-enabled microprocessor 106 stops broadcasting the corresponding PIN in response to the wireless communication device 102 receiving the corresponding PIN. This helps maintain security by preventing other wireless communication devices from being able to receive the PIN.

In an embodiment, once the wireless communication device 102 receives the PIN, the wireless communication device 102 is unlocked using the PIN and the wireless communication device 102 undergoes automated testing after being unlocked. The automated testing may involve a tester using the local tester computer 110 to issue commands associated with automated tests on the wireless communication device 102. The local tester computer 110 may communicate with the host computer 104 to conduct automated tests. The local tester computer 110 may also remotely command execution of scripts 118 on the wireless communication device 102 from the server 112 via secure network connections. The local test computer 110 and the server 112 may be general purpose computers described in more detail in regard to FIG. 4. The network 114 may comprise one or more public networks, one or more private networks, or a combination thereof.

In an embodiment, the wireless communication device 102 is communicatively coupled to the host computer 104 via a USB connection. The Bluetooth-enabled microprocessor 106 may also be communicatively coupled to the host computer 104 via a USB connection. In alternative embodiments, the wireless communication device 102 and the Bluetooth-enabled microprocessor 106 may be communicatively coupled to the host computer 104 via a different type of connection other than a USB connection.

The Bluetooth-enabled microprocessor 106 may be used to provide PINs to a plurality of different wireless communication devices under test using different MAC addresses for each wireless communication device. For example, the different wireless communication device 102n may be initially paired with the Bluetooth-enabled microprocessor 106 using a different MAC address prior to testing beginning. The initial pairing of the different wireless communication device 102n with the Bluetooth-enabled microprocessor 106 may be performed manually. Once the different wireless communication device 102n is initially paired with the Bluetooth-enabled microprocessor 106, each time the different wireless communication device 102n sees the different MAC address of the Bluetooth-enabled microprocessor 106, the different wireless communication device 102n can automatically connect to the Bluetooth-enabled microprocessor 106.

When a PIN is required for the different wireless communication device 102n during automated testing of the different wireless communication device 102n, the Bluetooth-enabled microprocessor 106 may be reprogrammed with a different image file via the host computer 104 that comprises a different MAC address and different PIN from the database 108 to pair with the different wireless communication device 102n. In an embodiment, as part of the re-programming, the image file 116 is removed from the Bluetooth-enabled microprocessor 106 such that only one image file is loaded into the Bluetooth-enabled microprocessor 106 at a time.

The host computer 104 may compile the different image file based on the different MAC address and the different PIN received from the database 108 and load the different image file, which includes the different MAC address and the different PIN, into the Bluetooth-enabled microprocessor 106. The different image file may be compiled and loaded into the Bluetooth-enabled microprocessor 106 in response to a restart of the different wireless communication device 102n, in response to an automatic lock occurring on the different wireless communication device 102n, after a pre-defined period of time of a lack of response from the different wireless communication device 102n, or in response to some other event that signifies that a PIN is needed by the different wireless communication device 102n under test. The Bluetooth-enabled microprocessor 106 with the different image file loaded thereon may be used as a virtual keyboard for the different wireless communication device 102n.

After the different image file is loaded into the Bluetooth-enabled processor 106, the Bluetooth-enabled processor 106 may broadcast the different PIN wirelessly. For example, the Bluetooth-enabled processor 106 may wirelessly broadcast the different PIN via Bluetooth until the different PIN is received by the different wireless communication device 102n. In order for the different wireless communication device 102n to receive the different PIN, the different wireless communication device 102n will have had to pair with the Bluetooth-enabled microprocessor 106 based on the different MAC address used in the initial pairing. In an embodiment, the broadcasting of the different PIN is delayed until the different wireless communication device 102n is paired with the Bluetooth-enabled microprocessor 106.

Consider the following as a non-limiting example. When the different wireless communication device 102n programmed with MAC address x receives a Bluetooth initiation broadcast message from the Bluetooth-enabled microprocessor 106 using MAC address y associated with the wireless communication device 102, the different wireless communication device 102n ignores this broadcast because the different wireless communication device 102n is not paired with the Bluetooth-enabled microprocessor 106 using MAC address x. After the Bluetooth-enabled processor 106 is re-imaged to have MAC address y, the different wireless communication device 102n programmed with MAC address y completes the Bluetooth pairing with the Bluetooth-enabled processor 106 and receives the different PIN from the Bluetooth-enabled microprocessor 106. While discussed above in terms of reimaging the Bluetooth-enabled microprocessor 106 when the different wireless communication device 102n needs the different PIN during testing, in some embodiments the different MAC address and the different PIN may be communicated to the Bluetooth-enabled microprocessor 106 without the need to reimage without departing from the spirit or scope of the present disclosure.

In an embodiment, the Bluetooth-enabled microprocessor 106 stops broadcasting the corresponding PIN in response to the different wireless communication device 102n receiving the corresponding PIN. This helps maintain security by preventing other wireless communication devices from being able to receive the different PIN.

In an embodiment, once the different wireless communication device 102n receives the different PIN, the different wireless communication device 102n is unlocked using the different PIN and the different wireless communication device 102n undergoes automated testing after being unlocked. The automated testing may involve a tester using the local tester computer 110 to issue commands associated with automated tests on the different wireless communication device 102n. The local tester computer 110 may communicate with the host computer 104 to conduct automated tests. The local tester computer 110 may also remotely command execution of scripts 118 on the different wireless communication device 102n from the server 112 via secure network connections.

In an embodiment, the different wireless communication device 102n is communicatively coupled to the host computer 104 via a USB connection. In an alternative embodiment, the different wireless communication device 102n may be communicatively coupled to the host computer 104 via a different type of connection other than a USB connection.

Figure 2:
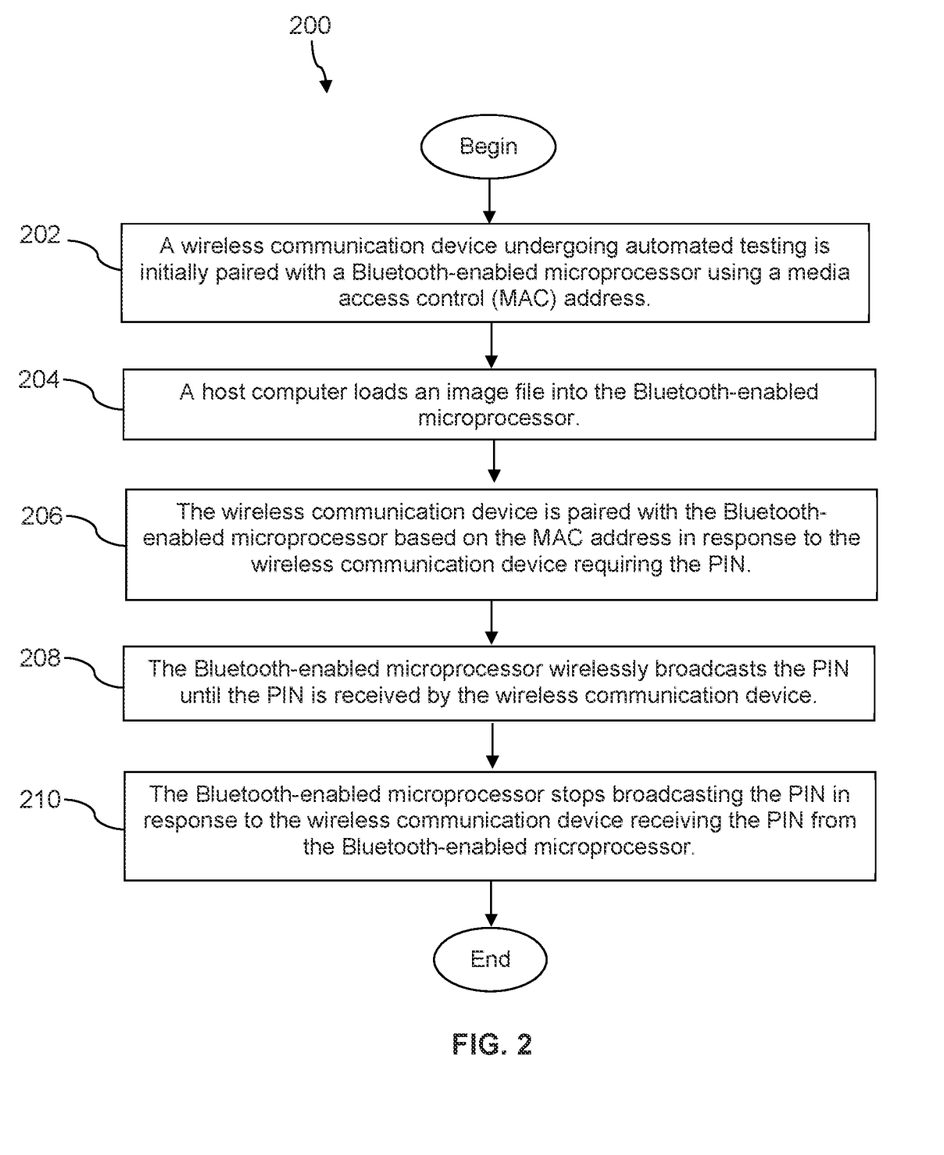
FIG. 2 is a flow chart of a method according to an embodiment of the disclosure.

Turning now to FIG. 2, a method 200 is described. In an embodiment, the method 200 is a method for personal identification number (PIN) unlock in automated wireless communication device testing. At block 202, a wireless communication device undergoing automated testing (e.g., wireless communication device 102) is initially paired with a Bluetooth-enabled microprocessor (e.g., Bluetooth-enabled microprocessor 106) using a media access control (MAC) address. At block 204, a host computer (e.g., host computer 104) loads an image file (e.g., image file 116) into the Bluetooth-enabled microprocessor. In an embodiment, the image file comprises the MAC address and a PIN for the wireless communication device. There may be a one-to-one relationship between the MAC address and the wireless communication device to prevent other wireless communication devices from being able to receive the PIN. At block 206, the wireless communication device is paired with the Bluetooth-enabled microprocessor based on the MAC address in response to the wireless communication device requiring the PIN. At block 208, the Bluetooth-enabled microprocessor wirelessly broadcasts the PIN until the PIN is received by the wireless communication device. In an embodiment, the wireless communication device is unlocked using the PIN and undergoes at least some of the automated testing after being unlocked. At block 210, the Bluetooth-enabled microprocessor stops broadcasting the PIN in response to the wireless communication device receiving the PIN from the Bluetooth-enabled microprocessor.

Figure 3A:
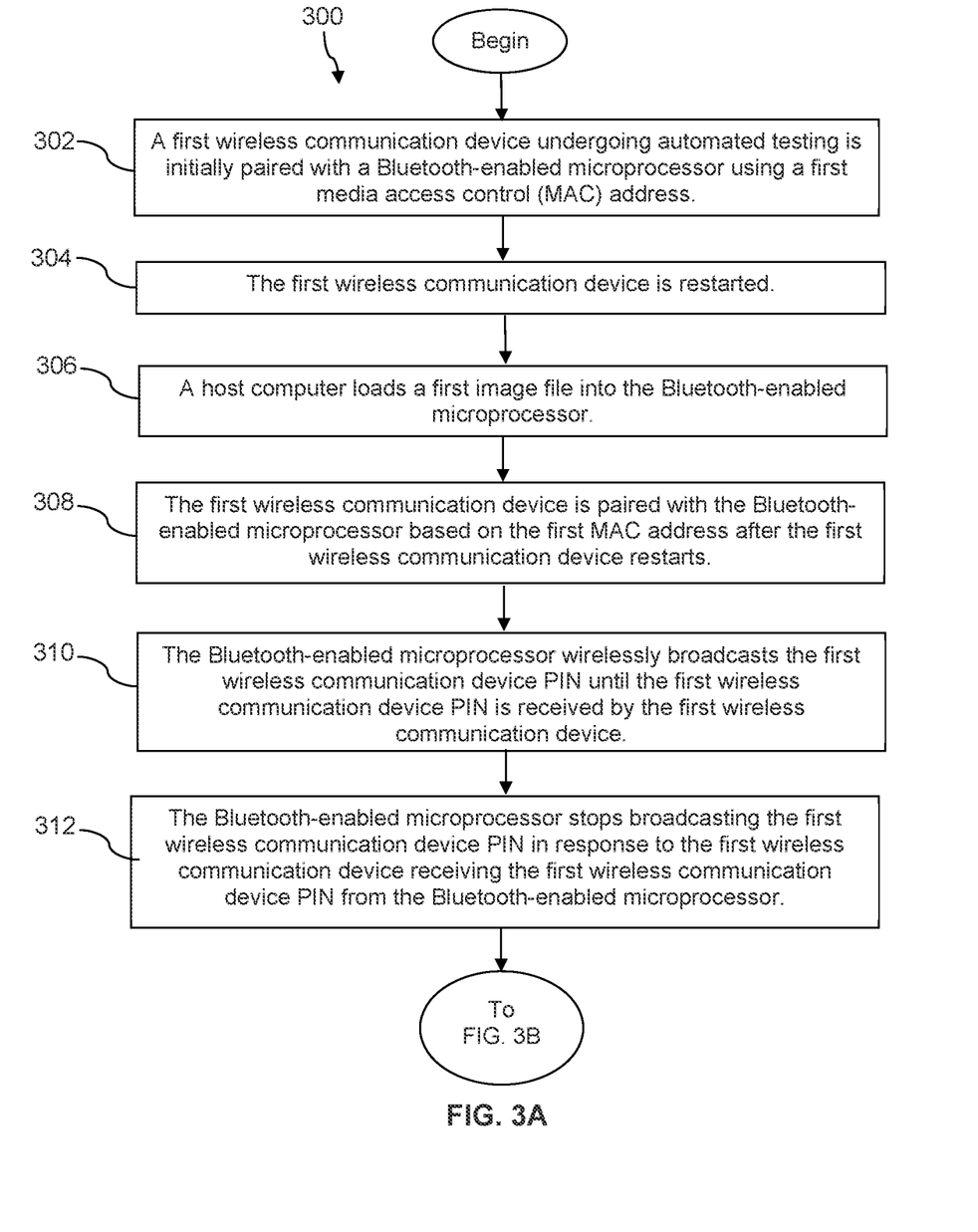
FIG. 3A and FIG. 3B are flow charts of a method according to an embodiment of the disclosure.
Figure 3B:
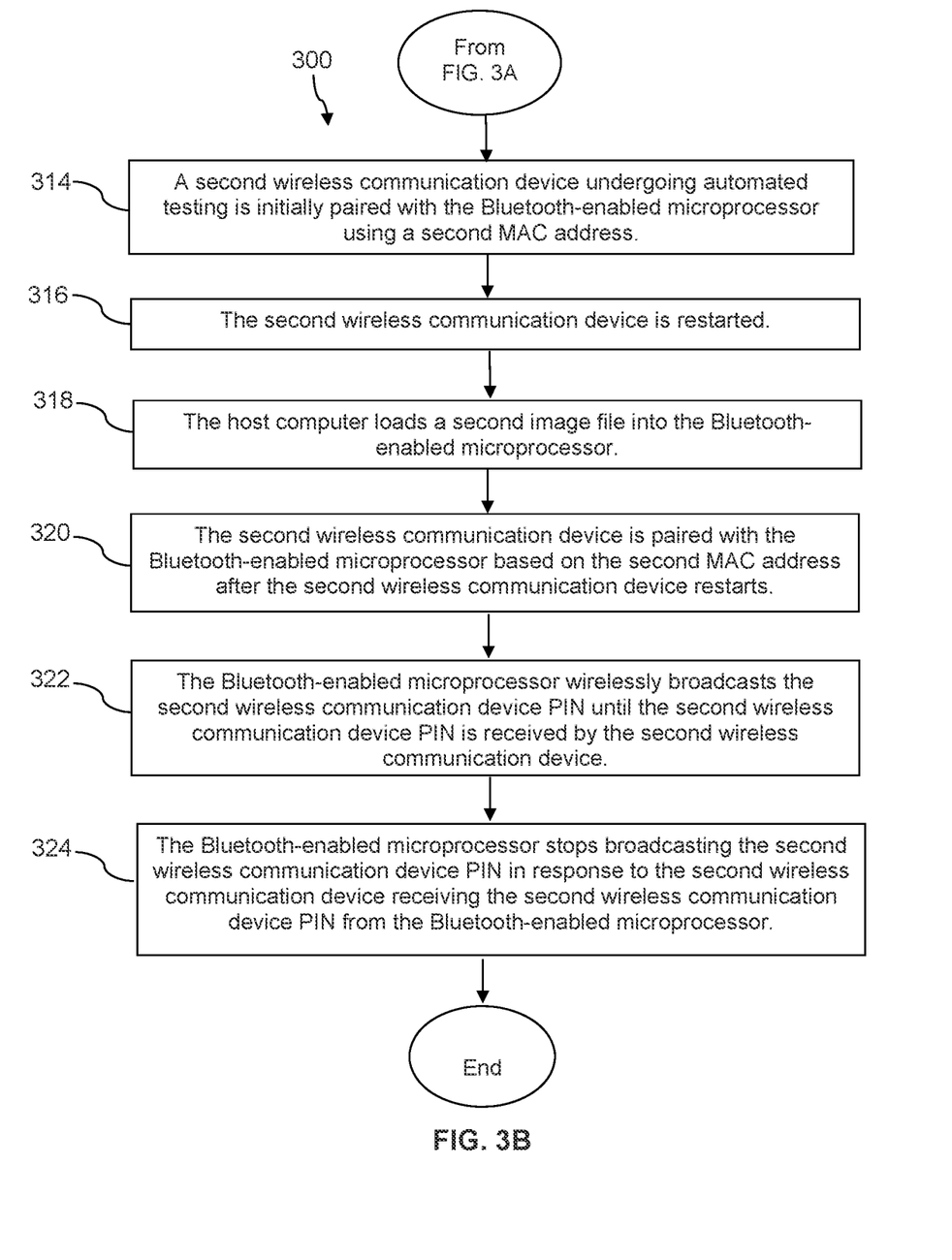

Turning now to FIG. 3A and FIG. 3B, a method 300 is described. In an embodiment, the method 300 is a method for personal identification number (PIN) unlock in automated wireless communication device testing. At block 302, a first wireless communication device undergoing automated testing (e.g., a first wireless communication device 102) is initially paired with a Bluetooth-enabled microprocessor (e.g., Bluetooth-enabled microprocessor 106) using a first media access control (MAC) address. At block 304, the first wireless communication device is restarted. At block 306, a host computer (e.g., host computer 104) loads a first image (e.g., image file 116) into the Bluetooth-enabled microprocessor. In an embodiment, the first image file comprises the first MAC address and a first wireless communication device PIN.

At block 308, the first wireless communication device is paired with the Bluetooth-enabled microprocessor based on the first MAC address after the first wireless communication device restarts. At block 310, the Bluetooth-enabled microprocessor wirelessly broadcasts the first wireless communication device PIN until the first wireless communication device PIN is received by the first wireless communication device. In an embodiment, the first wireless communication device is unlocked using the first wireless communication device PIN and undergoes at least some of the automated testing after being unlocked. At block 312, the Bluetooth-enabled microprocessor stops broadcasting the first wireless communication device PIN in response to the first wireless communication device receiving the first wireless communication device PIN from the Bluetooth-enabled microprocessor.

At block 314, a second wireless communication device undergoing automated testing (e.g., a second wireless communication device 102*n*) is initially paired with the Bluetooth-enabled microprocessor using a second MAC address. At block 316, the second wireless communication device is restarted. At block 318, the host computer loads a second image into the Bluetooth-enabled microprocessor. In an embodiment, the second image file comprises the second MAC address and a second wireless communication device PIN.

At block 320, the second wireless communication device is paired with the Bluetooth-enabled microprocessor based on the second MAC address after the second wireless communication device restarts. At block 322, the Bluetooth-enabled microprocessor wirelessly broadcasts the second wireless communication device PIN until the second wireless communication device PIN is received by the second wireless communication device. In an embodiment, the second wireless communication device is unlocked using the second wireless communication device PIN and undergoes at least some of the automated testing after being unlocked. At block 324, the Bluetooth-enabled microprocessor stops broadcasting the second wireless communication device PIN in response to the second wireless communication device receiving the second wireless communication device PIN from the Bluetooth-enabled microprocessor.

Figure 4:
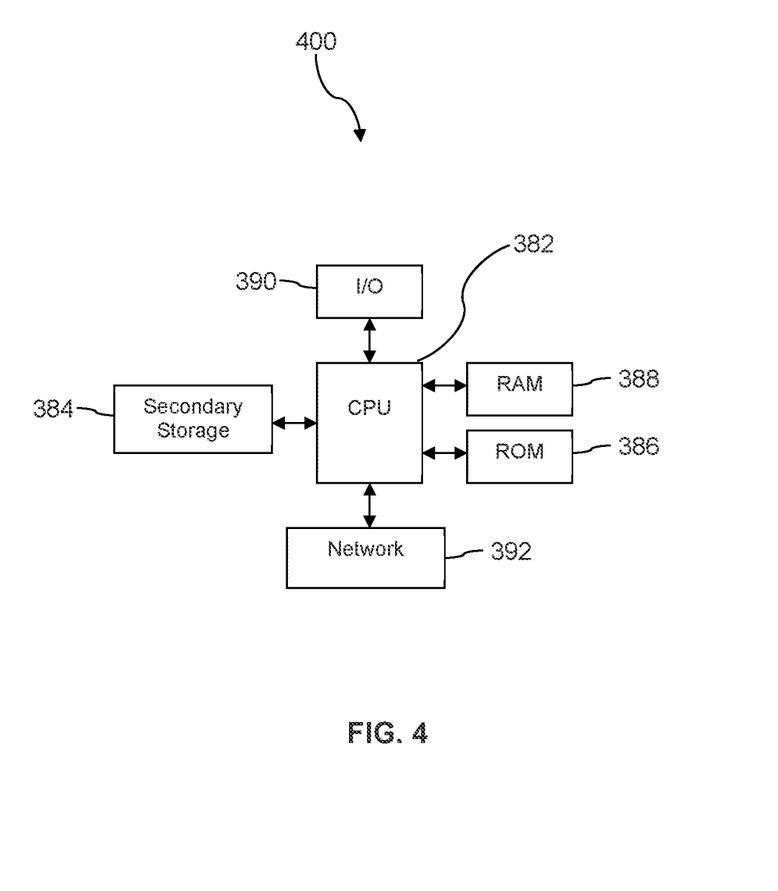
FIG. 4 is a block diagram of a computer system implemented within the communication system of FIG. 1 according to an embodiment of the disclosure.

FIG. 4 illustrates a computer system 400 suitable for implementing one or more embodiments disclosed herein. In an embodiment, the host computer 104, the local test computer 110, and/or the server 112 may be implemented as the computer system 400. The computer system 400 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 400, at least one of the CPU 382, the RAM 388, and the ROM 386 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 384, to the ROM 386, to the RAM 388, and/or to other non-volatile memory and volatile memory of the computer system 400. The processor 382 may process the executable instructions and/or data structures in part by directly accessing the computer program product, for example by reading from a CD-ROM disk inserted into a disk drive peripheral of the computer system 400. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 400.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for personal identification number (PIN) unlock in automated wireless communication device testing, comprising:
   initially pairing a first wireless communication device undergoing automated testing with a Bluetooth-enabled microprocessor using a first media access control (MAC) address;
   restarting the first wireless communication device;
   loading, by a host computer, a first image file into the Bluetooth-enabled microprocessor, wherein the first image file comprises the first MAC address and a first wireless communication device PIN;
   pairing the first wireless communication device with the Bluetooth-enabled microprocessor based on the first MAC address after the first wireless communication device restarts;
   broadcasting, by the Bluetooth-enabled microprocessor, the first wireless communication device PIN until the first wireless communication device PIN is received by the first wireless communication device, wherein the first wireless communication device is unlocked using the first wireless communication device PIN and undergoes at least some of the automated testing after being unlocked;
   stopping broadcasting of the first wireless communication device PIN by the Bluetooth-enabled microprocessor in response to the first wireless communication device receiving the first wireless communication device PIN from the Bluetooth-enabled microprocessor;
   initially pairing a second wireless communication device undergoing automated testing with the Bluetooth-enabled microprocessor using a second MAC address, wherein the first and second MAC addresses are different;
   restarting the second wireless communication device;
   loading, by the host computer, a second image file into the Bluetooth-enabled microprocessor, wherein the second image file comprises the second MAC address and a second wireless communication device PIN for the second wireless communication device;
   pairing the second wireless communication device with the Bluetooth-enabled microprocessor based on the second MAC address after the second wireless communication device restarts;
   broadcasting, by the Bluetooth-enabled microprocessor, the second wireless communication device PIN until the second wireless communication device PIN is received by the second wireless communication device, wherein the second wireless communication device is unlocked using the second wireless communication device PIN and undergoes at least some of the automated testing after being unlocked; and
   stopping broadcasting of the second wireless communication device PIN by the Bluetooth-enabled microprocessor in response to the second wireless communication device receiving the second wireless communication device PIN from the Bluetooth-enabled microprocessor.

2. The method of claim 1, wherein only one image file is loaded into the Bluetooth-enabled microprocessor at a time.

3. The method of claim 2, further comprising removing the first image file from the Bluetooth-enabled microprocessor prior to loading the second image file into the Bluetooth-enabled microprocessor.

4. The method of claim 2, wherein the host computer loads the first image file to the Bluetooth-enabled microprocessor and loads the second image file to the Bluetooth-enabled microprocessor via a Universal Serial Bus (USB) connection with the Bluetooth-enabled microprocessor.

5. The method of claim 1, wherein the Bluetooth-enabled microprocessor with the first image file loaded thereon is used as a virtual keyboard for the first wireless communication device, and wherein the Bluetooth-enabled microprocessor with the second image file loaded thereon is used as a virtual keyboard for the second wireless communication device.

6. The method of claim 1, wherein the first wireless communication device and the second wireless communication device each comprise an iOS operating system.

7. The method of claim 1, wherein the initial pairing of the first wireless communication device with the Bluetooth-enabled microprocessor and the initial pairing of the second wireless communication device with the Bluetooth-enabled microprocessor are done manually.

8. A system for personal identification number (PIN) unlock in automated wireless communication device testing, comprising:
   a wireless communication device undergoing automated testing, wherein the wireless communication device is initially paired with a Bluetooth-enabled microprocessor using a media access control (MAC) address;
   a database comprising the MAC address and a PIN associated with the wireless communication device, wherein there is a one-to-one relationship between the MAC address and the wireless communication device to prevent other wireless communication devices from being able to receive the PIN;
   a host computer configured to load an image file into the Bluetooth-enabled microprocessor in response to the wireless communication device restarting, wherein the image file comprises the MAC address and the PIN for the wireless communication device from the database; and the Bluetooth-enabled microprocessor configured to:
broadcast the PIN after the wireless communication device restarts and pairs with the Bluetooth-enabled microprocessor based on the MAC address until the PIN is received by the wireless communication device, and
stop broadcasting the PIN in response to the wireless communication device receiving the PIN, wherein the wireless communication device is unlocked using the PIN and undergoes at least some of the automated testing after being unlocked.

9. The system of claim 8, wherein the host computer is communicatively coupled to the wireless communication device via a Universal Serial Bus (USB) connection.

10. The system of claim 8, wherein the host computer is communicatively coupled to the Bluetooth-enabled microprocessor via a Universal Serial Bus (USB) connection.

11. The system of claim 8, further comprising a server configured to store scripts for the automated testing, wherein the at least some of the automated testing comprises executing one or more scripts from the server.

12. The system of claim 8, further comprising a local tester computer configured to receive commands from a tester, communicate with the host computer, and command the server to execute the one or more scripts.

13. The system of claim 8, wherein the Bluetooth-enabled microprocessor with the image file loaded thereon is used as a virtual keyboard for the wireless communication device.

14. The system of claim 8, wherein the wireless communication device comprises an iOS operating system.

15. The system of claim 8, wherein the MAC address and the PIN are associated with the wireless communication device in the database via a wireless communication device identity.

16. A method for personal identification number (PIN) unlock in automated wireless communication device testing, comprising: initially pairing a wireless communication device undergoing automated testing with a Bluetooth-enabled microprocessor using a media access control (MAC) address; loading, by a host computer, an image file into the Bluetooth-enabled microprocessor, wherein the image file comprises the MAC address and a PIN for the wireless communication device, wherein there is a one-to-one relationship between the MAC address and the wireless communication device to prevent other wireless communication devices from being able to receive the PIN; pairing the wireless communication device with the Bluetooth-enabled microprocessor based on the MAC address in response to the wireless communication device requiring the PIN; broadcasting, by the Bluetooth-enabled microprocessor, the PIN until the PIN is received by the wireless communication device, wherein the wireless communication device is unlocked using the PIN and undergoes at least some of the automated testing after being unlocked; and stopping broadcasting of the PIN by the Bluetooth-enabled microprocessor in response to the wireless communication device receiving the PIN from the Bluetooth-enabled microprocessor.

17. The method of claim 16, wherein the wireless communication device requires the PIN in response to a restart of the wireless communication device.

18. The method of claim 16, wherein the wireless communication device requires the PIN in response to an automatic lock of the wireless communication device.

19. The method of claim 16, wherein the wireless communication device comprises an iOS operating system.

20. The method of claim 16, wherein only one image file is loaded into the Bluetooth-enabled microprocessor at a time.

21. The method of claim 16, wherein the Bluetooth-enabled microprocessor with the image file loaded thereon is used as a virtual keyboard for the wireless communication device.

* * * * *